(12) United States Patent
Brand

(10) Patent No.: US 7,792,671 B2
(45) Date of Patent: Sep. 7, 2010

(54) AUGMENTATION AND CALIBRATION OF OUTPUT FROM NON-DETERMINISTIC TEXT GENERATORS BY MODELING ITS CHARACTERISTICS IN SPECIFIC ENVIRONMENTS

(75) Inventor: Michael Brand, Or Yehuda (IL)

(73) Assignee: Verint Americas Inc., Roswell, GA (US)

( * ) Notice: Subject to any disclaimer, the term of this patent is extended or adjusted under 35 U.S.C. 154(b) by 1130 days.

(21) Appl. No.: 10/771,409

(22) Filed: Feb. 5, 2004

(65) Prior Publication Data

US 2004/0158469 A1 Aug. 12, 2004

Related U.S. Application Data

(60) Provisional application No. 60/444,982, filed on Feb. 5, 2003.

(51) Int. Cl.
*G10L 15/00* (2006.01)

(52) U.S. Cl. .................................................. 704/240

(58) Field of Classification Search .................. 704/231, 704/240, 256, 265.1
See application file for complete search history.

(56) References Cited

U.S. PATENT DOCUMENTS

| 5,550,930 A | 8/1996 | Berman et al. |
| 5,625,748 A * | 4/1997 | McDonough et al. ........ 704/251 |
| 6,397,181 B1 | 5/2002 | Li et al. |
| 2002/0173955 A1* | 11/2002 | Reich ........................ 704/231 |
| 2002/0184016 A1 | 12/2002 | Hartley et al. |

* cited by examiner

*Primary Examiner*—Angela A Armstrong
(74) *Attorney, Agent, or Firm*—Lawrence A. Aaronson, P.C.

(57) ABSTRACT

Outputs of an automatic probabilistic event detection system, such as a fact extraction system, a speech-to-text engine or an automatic character recognition system, are matched with comparable results produced manually or by a different system. This comparison allows statistical modeling of the run-time behavior of the event detection system. This model can subsequently be used to give supplemental or replacement data for an output sequence of the system. In particular, the model can effectively calibrate the system for use with data of a particular statistical nature.

83 Claims, 2 Drawing Sheets

AUGMENTATION AND CALIBRATION OF OUTPUT FROM NON-DETERMINISTIC TEXT GENERATORS BY MODELING ITS CHARACTERISTICS IN SPECIFIC ENVIRONMENTS

CROSS-REFERENCE TO RELATED APPLICATIONS

This application is related to and claims priority to U.S. provisional application entitled METHOD FOR AUTOMATIC AND SEMI-AUTOMATIC CLASSIFICATION AND CLUSTERING OF NON-DETERMINISTIC TEXTS having Ser. No. 60/444,982, by Assaf ARIEL, Itsik HOROWITZ, Itzik STAUBER, Michael BRAND, Ofer SHOCHET and Dror ZIV, filed Feb. 5, 2003 and incorporated by reference herein. This application is also related to the application entitled METHOD FOR AUTOMATIC AND SEMI-AUTOMATIC CLASSIFICATION AND CLUSTERING OF NON-DETERMINISTIC TEXTS having Ser. No. 10/771,315, by Assaf ARIEL, Michael BRAND, Itsik HOROWITZ, Ofer SHOCHET, Itzik STAUBER and Dror ZIV, filed on Feb. 5, 2004 and incorporated by reference herein.

BACKGROUND OF THE INVENTION

1. Field of the Invention

The present invention is directed to text generation systems, such as speech-to-text, automatic character recognition (e.g., OCR) and fact extraction systems and, more particularly, to producing more meaningful confidence scores for text that is generated by such systems.

2. Description of the Related Art

In general, spoken document retrieval (SDR) is composed of two stages: transcription of speech and information retrieval (IR). Transcription of the speech is often referred to as speech-to-text (STT) or automatic speech recognition (ASR), and is often performed using a large vocabulary continuous speech recognizer (LVCSR). Information retrieval (IR) is a general term referring to all forms of data mining. One common form of data mining, for example, is query-based retrieval, where, based on a user's query, documents are retrieved and presented to the user, ordered by an estimated measure of their relevance to the query. Traditionally, this stage is performed on the text output of the first stage.

In transcribing spoken words to text, there is always a question of whether the words are transcribed correctly, particularly when the transcription is obtained automatically by an ASR system. The most accurate large vocabulary ASR systems receive clear voice signals and are trained to recognize speech by each individual using the system in a time-consuming process. In applications with numerous users, many of whom may use the system only once without first training the system and which receive low grade audio signals, such as those obtained via a telephone system, transcribing text is difficult and the resulting accuracy is low.

To improve the accuracy of transcription or speech recognition in applications with many users for whom the system has not been trained, the context of the speech is commonly used. For example in an interactive voice response (IVR) system that has speech output as well as input, communication with the system typically uses a very small vocabulary, often just "yes" or "no" and when more words may be included, a syntax may define where only certain words can be recognized in a predefined order, such as "City, Boston" or "City, Chicago". An example where a larger vocabulary is used is the transcription of communication between air traffic controllers and aircraft cockpits which follow a predictable pattern. In this case the pattern is known and as a result it is possible to produce an ASR system that can generate more accurate transcriptions of air traffic control communications than a general-purpose ASR system could.

However, there are many potential applications of ASR for which it is difficult to determine the rules that are followed in conversations, if any rules exist. LVCSRs solve this problem by approximating conversational speech through a Markovian model, where the probability of each word to appear is determined by the last few words that were uttered.

Most ASRs output recognition confidence scores or other additional information along with their text output. This output can then be used by IR systems that operate on the outputs of the ASR, as discussed in the concurrently filed application entitled METHOD FOR AUTOMATIC AND SEMI-AUTOMATIC CLASSIFICATION AND CLUSTERING OF NON-DETERMINISTIC TEXTS. For such systems it is beneficial that the output of the ASR will be as rich and as accurate as possible, even in its non-textual outputs.

It would be possible to improve the operation of ASRs and of these client IR systems, if a way could be found to augment and calibrate the outputs of ASRs, such as by an automatic way to map how well various parts of the model of the ASRs fit real conversations, and by correcting the outputs accordingly. Furthermore, it would be beneficial if such augmentation and calibration could be done by a person who has no access or knowledge of the internal operation of the ASR.

SUMMARY OF THE INVENTION

It is an aspect of the present invention to provide additional or alternate information for the output of an automatic system for probabilistic detection of events.

It is another aspect of the present invention to provide more meaningful confidence scores for text output by a text generation system.

It is a further aspect of the present invention to calibrate output of a text generation system for a particular environment.

The above aspects can be attained by a method of processing outputs of an automatic system for probabilistic detection of events, including collecting statistics related to observed outputs of the automatic system, and using the statistics to process an original output sequence of the automatic system and produce an alternate output sequence by at least one of supplementing and replacing at least part of the original output sequence. For example, data in the alternate output sequence may include confidence assessments regarding parts of at least one of the original and alternate output sequences, where the confidence assessments supplement or replace data in the original output sequence.

The alternate output sequence may include one or more of the following: (1) an alternate recognition score for at least one of the words, (2) at least one alternate word whose presence may have been one detectable event that transpired, (3) at least one alternate word along with a recognition score for the at least one alternate word, (4) at least one alternate sequence of words whose presence may have been another detectable event that transpired, (5) at least one alternate sequence of words along with a recognition score for at least one word that is part of the at least one alternate sequence of words, (6) an indication that no detectable event has transpired, (7) a word lattice describing a plurality of alternatives for detectable word sequences, and (8) a word lattice along with a recognition score for at least one among at least one word in the detectable word sequences, at least one path in the word lattice, and at least one edge in the word lattice.

In particular, the alternate output sequence may include information of a plurality of alternatives that can replace at least part of the original output sequence that can be used by client systems that can use the at least part of the original output sequence directly. The information collected may include at least one of noting and estimating correctness of at least one event that the automatic system detected, or information of detectable event(s) that may have transpired in correspondence with at least part of the original output sequence produced by the automatic system.

The alternate output sequence may be generated by building a first model modeling behavior of the automatic system as a process with at least one inner state, which may be unrelated to inner states of the automatic system, and inferring the at least one inner state of the process from the observed outputs of the automatic system; building a second model, based on the statistics obtained by collecting, to infer data to at least one of supplement and replace at least part of the original output sequence from the at least one inner state of the process in the first model; combining the first and second models to form a function for converting the original output sequence into the alternate output sequence; and using the function on the original output sequence of the automatic system to create the alternate output sequence. The function may be applied to different original output sequences of the automatic system to create additional alternate output sequences.

Preferably, the first model is one of a Generalized Hidden Markov process and a special case of a Generalized Hidden Markov process, while the second model is a parametric model built using at least one direct parametric estimation technique for inferring from at least one of the inner states. The at least one direct parametric estimation technique preferably includes at least one of maximal likelihood estimation and entropy maximization.

Preferably the generation of the second model for at least one of the inner states is based on at least one estimation technique utilizing information estimated for other inner states. For example, the estimation technique may use a mixture model or kernel-based learning.

The building of the first and second models may assume the inner states of the process to be fully determined by the observed outputs during at least one point in time. In particular, the inner states of the process may be assumed during at least one point in time to be fully determined by a subset of the observed outputs that includes at least an identity of at least one event detected by the automatic system. Furthermore, the building of at least one of the first and second models may use at least one discretization function.

These models may be built by collecting samples of statistically different sets of materials as initial training material. Preferably, parameters are identified that remain invariant between the statistically different sets of materials. This can improve estimation of at least one of the parameters and can enable training when available statistically self-similar sets of materials are too small to allow conventional training and to increase effectiveness of further training on material that is not statistically similar to initial training material. However, it is preferable that the material used to collect statistics is statistically similar to material used in later stages.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
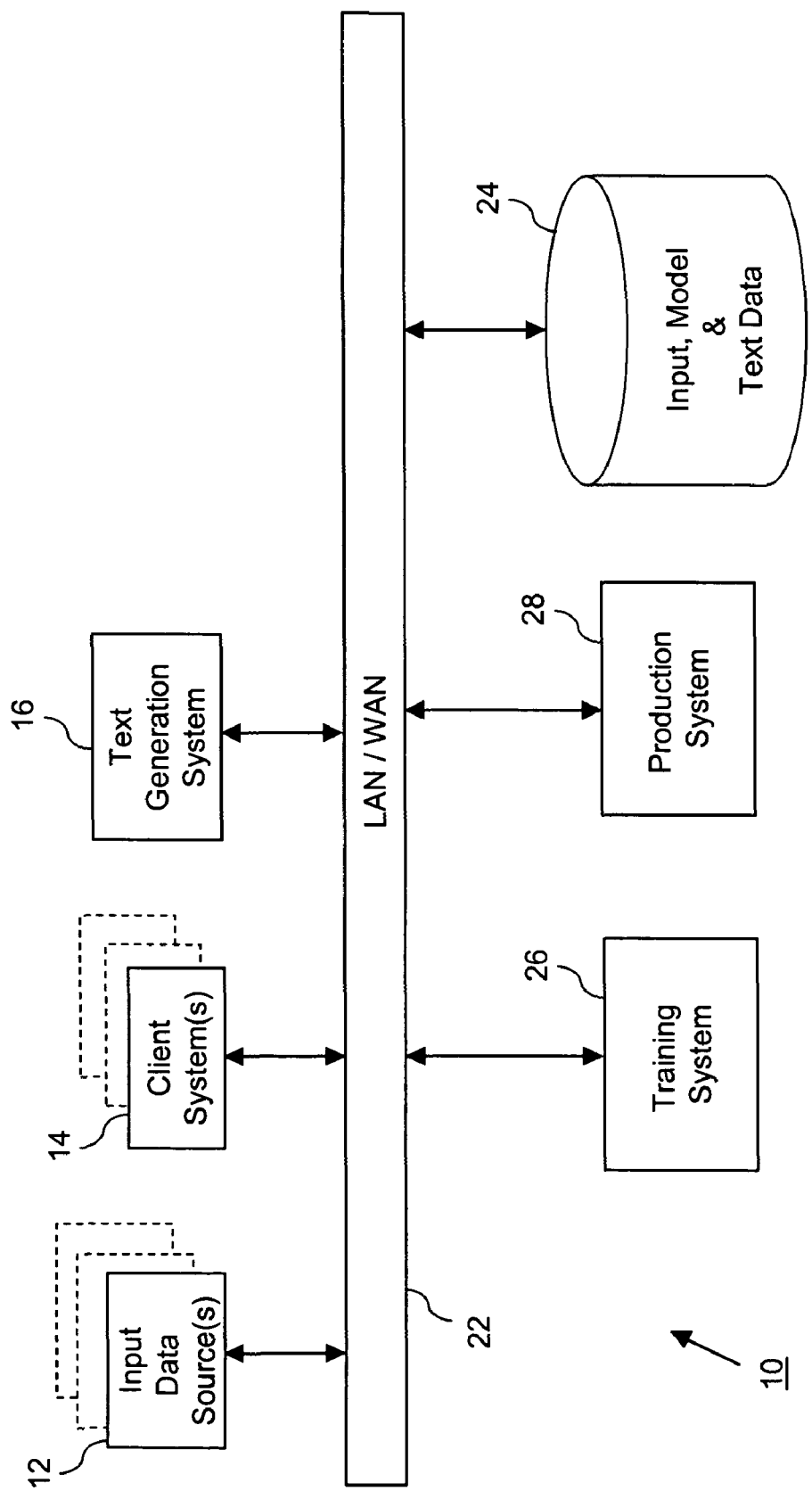
FIG. 1 is a block diagram of a system for generating text and meaningful confidence scores according to the invention.

The present invention may be implemented on many types of systems using many different types of data processing hardware. An example is illustrated in FIG. 1 for a system 10 that has one or more input data sources 12, and client system(s) 14 providing access to the system 10. The data provided by input data sources 12 are supplied to an automatic system for probabilistic detection of events, which typically is a text generation system 16, such as a speech-to-text system, an automatic character recognition (e.g., OCR) system, or a fact extraction system. Client system(s) 14 may include any known implementation of ranking, classification, filtering, clustering and labeling, all of which benefit in a similar manner from improved output from ASRs. In FIG. 1, text generation system 16 is shown connected to input data source(s) 12 and client system(s) 14 via network 22, but on a smaller scale system, these connections may be provided by a bus and peripheral interfaces in one or more housings.

As illustrated in FIG. 1, one or more storage devices 24 may be used to store input data for processing, the output of text generation system 16 and a model of how the text generation system operates, so that alternative output, such as more meaningful confidence scores, etc., can be produced as discussed below. Training system 26, illustrated in FIG. 1, is used to produce the model, while production system 28 uses the model to produce alternative output from the text output by text generation system 16. On a smaller scale system, training system 26 and production system 28 may be a single processor executing different program code, obtained from computer readable media, such as storage device 24, for training and production.

Figure 2:
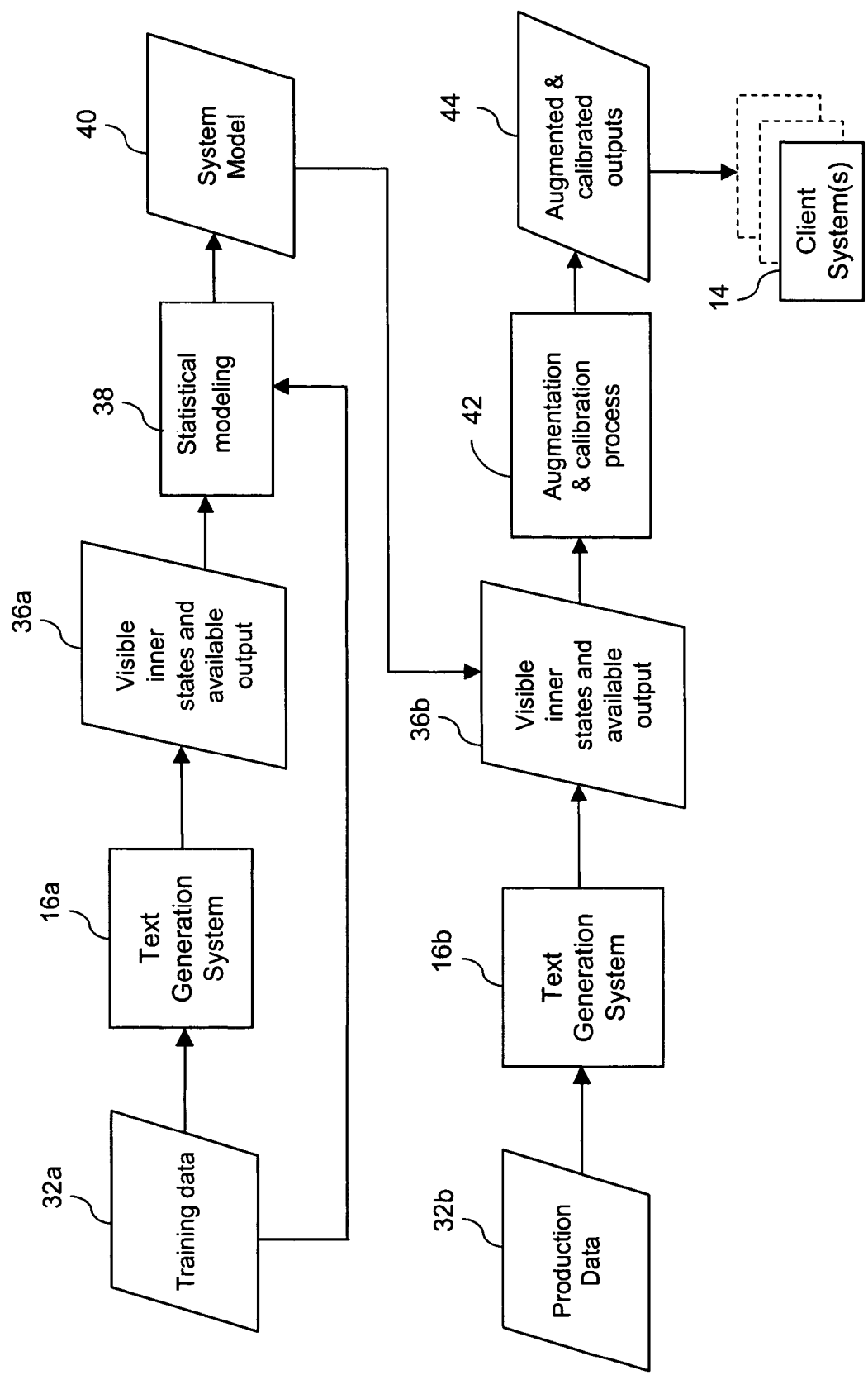
FIG. 2 is a flowchart of a method for producing meaningful confidence scores according to the invention.

A system like that illustrated in FIG. 1 executes instructions for controlling at least one computer system to perform the method illustrated in FIG. 2 to process outputs of an automatic system for probabilistic detection of events. Initially, training data 32a is input to the automatic system, represented by text generation system 16a at this point of the flow in FIG. 2. Visible inner states and available output 36a (during the training phase) are used by statistical modeling 38 to produce the model 40 of the system. This is accomplished by processing training data 32a and comparing the results with visible inner states and available output 36a.

As a simplified example, assume text generation system 16 outputs a single word at a time with no additional information. In this case, text generation system 16 can be modeled by assuming that its state at any point in time can be entirely determined by the word that it outputs at that time. To model its behavior in each state, training system 26 would count how many times each word is output by text generation system 16 and how many recognitions were correct when processing training data 32a obtained from a specific environment, such as telephone calls to an insurance company. These two pieces of information can be used to generate a percentage that can be used as a recognition confidence score whenever that word is output on production data 32b. This enables production system 28 to provide a confidence score, calibrated to the specific environment from which the training data was obtained, that was not included in an original output sequence generated by text generation system 16.

Therefore, training system 26 needs to be able to determine the accuracy of the output of text generation system 16 to be able to generate system model 40, preferably based on data that is more reliable than the output of text generation system 16. This can be done in several different ways, depending on the type of text generation system 16 used and the environment in which it is applied. For example, in the case of an ASR system, a human transcription of training data 32a can be obtained and compared with the output of the ASR system by training system 26. In addition, it may be possible to improve the quality of the alternatively processed training data, e.g., by using uncompressed voice signals in obtaining the transcription used for comparison. There may also be independent confirmation of the content, such as when notes about the conversation are recorded by one of the participants in a conversation used as training data 32a. When text generation system 16 is a fact extraction system, training data 32a may be selected so that the relevant facts that should be output by the fact extraction system are known and thus, training system 26 can compare visible states and available output 36a of the fact extraction system with the known relevant facts.

In addition, training system 26 may note the correct word each time an incorrectly recognized word is output by text generation system 16. In this case, production system 28 can output, whenever a word is recognized, not only a confidence score, but also a whole list of high-ranking alternatives, based on common misrecognition errors of text generation system 16.

During operations on production data 32b, text generation system 16b (ordinarily the same system as text generation system 16a) produces visible inner states and available output 36b. Using system model 40, augmentation and calibration process 42 produces augmented and calibrated outputs 44. The augmented and calibrated outputs 44 may be used to supplement the original output sequence of text generation system 16 as described above, or production system 28 may use an alternate output sequence obtained from system model 40 to replace the original output sequence. For example, if text generation system 16 produces a confidence score that is not as accurate as the confidence score obtained from system model 40, the confidence score obtained from system model 40 can be output to user(s) instead. Similarly, if training system 26 determines that an ASR systematically mistakes the word "pan" for "ban" and that "ban" is a word with very low likelihood of being used in operation of text generation system 16, production system 28 can simply replace "ban" with "pan" whenever the output 36b from text generation system 16 contains the word "ban".

In the above example, where the entire state of the ASR is modeled by the word it is currently outputting, a mapping from words to alternate output sequences used for replacement or additional output, can be created during the training. This mapping can be used whenever a word that appears in the mapping is detected in the output. For example, words may be mapped to scores, so that whenever a word is output, it is looked up and the score is added to the output (or may replace an existing score when the original output includes a score). If there is a possibility that generation system 16 will output a word that was not present in the training data, a procedure for handling the case is determined during the training.

The present invention has been described primarily with respect to a speech-to-text system, but is applicable to any automatic system for probabilistic detection of events, including automatic character recognizers, fact extraction systems and any systems generating non-deterministic text with confidence scores.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, training system 26 and production system 28 do not need to be connected, but may be two different computer systems running similar software with the system model 40 transferred from training system 26 to production system 28 using any conventional method, including removable computer readable media, such as CD-ROM(s).

What is claimed is:

1. A computer-implemented method of processing outputs of an automatic system for probabilistic detection of events, comprising:
   collecting statistics at a training system executing on a computing device, the statistics related to observed outputs of the automatic system comprising:
      providing at least one input sequence to the automatic system, the input sequence associated with a transcript;
      observing an output sequence of a text generating system executing on a computing device of the automatic system generated in response to the provided at least one input sequence; and
      comparing the output sequence with the transcript; and
   using the statistics at the training system to process automatically an original output sequence of the automatic system and produce an alternate output sequence and a confidence assessment regarding parts of at least one of the original output sequence and the alternate output sequence, the process including at least one of automatically supplementing and replacing at least part of the original output sequence with the alternate output sequence in accordance with the confidence assessment.

2. A computer-implemented method as recited in claim 1, wherein at least part of the alternate output sequence contains information that can be used by systems that can use the at least part of the original output sequence directly.

3. A computer-implemented method as recited in claim 2, wherein data in the alternate output sequence includes confidence assessments regarding parts of at least one of the original and alternate output sequences, where the confidence assessments supplement data in the original output sequence.

4. A computer-implemented method as recited in claim 1, wherein the alternate output sequence includes information of a plurality of alternatives that can replace at least part of the original output sequence that can be used by systems that can use the at least part of the original output sequence directly.

5. A computer-implemented method as recited in claim 4, wherein data in the alternate output sequence includes confidence assessments regarding parts of the alternatives, where the confidence assessments supplement data in the original output sequence.

6. A computer-implemented method as recited in claim 4, wherein data in the alternate output sequence includes confidence assessments regarding parts of the alternatives, where the confidence assessments replace at least part of the original output sequence.

7. A computer-implemented method as recited in claim 1, wherein the detected events involve word recognition.

8. A computer-implemented method as recited in claim 7, wherein the automatic system is an automatic speech recognition system.

9. A computer-implemented method as recited in claim 8,
  wherein the automatic speech recognition system operates on low-grade audio signals having word recognition precision below 50 percent; and
  wherein said method further comprises utilizing human transcription of the low-grade audio signals as a source for data relating to the statistics being collected.

10. A computer-implemented method as recited in claim 7, wherein the automatic probabilistic event detection system is an automatic character recognition system.

11. A computer-implemented method as recited in claim 7, wherein the alternate output sequence includes at least one of
  an alternate recognition score for at least one of the words,
  at least one alternate word that may have been one detectable event that transpired,
  the at least one alternate word along with a recognition score for the at least one alternate word,
  at least one alternate sequence of words that may have been another detectable event that transpired,
  the at least one alternate sequence of words along with a recognition score for at least one word that is part of the at least one alternate sequence of words,
  an indication that no detectable event has transpired,
  a word lattice describing a plurality of alternatives for detectable word sequences, and
  the word lattice along with a recognition score for at least one among
    at least one word in the detectable word sequences,
    at least one path in the word lattice, and
    at least one edge in the word lattice.

12. A computer-implemented method as recited in claim 1, wherein said using comprises:
  building a first model modeling behavior of the automatic system as a process with at least one inner state, which may be unrelated to inner states of the automatic system, and inferring the at least one inner state of the process from the observed outputs of the automatic system;
  building a second model, based on the statistics obtained by said collecting, to infer data to at least one of supplement and replace at least part of the original output sequence from the at least one inner state of the process in the first model;
  combining the first and second models to form a function for converting the original output sequence into the alternate output sequence; and
  using the function on the original output sequence of the automatic system to create the alternate output sequence.

13. A computer-implemented method as recited in claim 12, further comprising repeating said using of the function on different original output sequences of the automatic system to create additional alternate output sequences.

14. A computer-implemented method as recited in claim 12, wherein the process in said first model is one of a Generalized Hidden Markov process and a special case of a Generalized Hidden Markov process.

15. A computer-implemented method as recited in claim 12,
  wherein the second model is a parametric model, and
  wherein said building of the second model uses at least one direct parametric estimation technique for inferring from at least one of the inner states.

16. A computer-implemented method as recited in claim 15, wherein the at least one direct parametric estimation technique includes at least one of maximal likelihood estimation and entropy maximization.

17. A computer-implemented method as recited in claim 12, wherein for at least one of the inner states said building of the second model uses at least one estimation technique utilizing information estimated for other inner states.

18. A computer-implemented method as recited in claim 17, wherein the at least one estimation technique utilizes at least one of a mixture model and kernel-based learning.

19. A computer-implemented method as recited in claim 12, wherein said building of the first and second models assumes the inner states of the process to be fully determined by the observed outputs during at least one point in time.

20. A computer-implemented method as recited in claim 19, wherein said building of the first and second models assumes the inner states of the process during at least one point in time to be fully determined by a subset of the observed outputs that includes at least an identity of at least one event detected by the automatic system.

21. A computer-implemented method as recited in claim 12, wherein said building of at least one of the first and second models uses at least one discretization function.

22. A computer-implemented method as recited in claim 12, wherein at least one of said building and combining uses Bayesian methods.

23. A computer-implemented method as recited in claim 1, further comprising repeating said collecting on several statistically different training materials.

24. A computer-implemented method as recited in claim 23, wherein said collecting uses samples of statistically different sets of materials as initial training material.

25. A computer-implemented method as recited in claim 23, further comprising identifying parameters that remain invariant between the statistically different sets of materials.

26. A computer-implemented method as recited in claim 25, wherein said identifying improves estimation of at least one of the parameters.

27. A computer-implemented method as recited in claim 25, wherein said identifying is used to enable training when available statistically self-similar sets of materials are too small to allow effective training.

28. A computer-implemented method as recited in claim 25, wherein said identifying is used to increase effectiveness of further training on material that is not statistically similar to initial training material.

29. A computer-implemented method as recited in claim 1, wherein material used for said collecting is statistically similar to material used during said using.

30. At least one computer readable medium storing instructions for controlling at least one computer system to perform a method of processing outputs of an automatic system for probabilistic detection of events, comprising:
  collecting statistics related to observed outputs of the automatic system comprising:
    providing at least one input sequence to the automatic system, the input sequence associated with a transcript;
    observing an output sequence of the automatic system generated in response to the provided at least one input sequence; and
    comparing the output sequence with the transcript; and using the statistics to process automatically an original output sequence of the automatic system and produce an alternate output sequence and a confidence assessment regarding parts of at least one of the original output sequence and the alternate output sequence, the process including at least one of automatically supplementing and replacing at least part of the original output sequence with the alternate output sequence in accordance with the confidence assessment.

31. At least one computer readable medium as recited in claim 30, wherein at least part of the alternate output sequence contains information that can be used by systems that can use the at least part of the Original output sequence directly.

32. At least one computer readable medium as recited in claim 31, wherein data in the alternate output sequence includes confidence assessments regarding parts of at least one of the Original and alternate output sequences, where the confidence assessments supplement data in the Original output sequence.

33. At least one computer readable medium as recited in claim 30, wherein the alternate output sequence includes information of a plurality of alternatives that can replace at least part of the Original output sequence that can be used by systems that can use the at least part of the Original output sequence directly.

34. At least one computer readable medium as recited in claim 33, wherein data in the alternate output sequence includes confidence assessments regarding parts of the alternatives, where the confidence assessments supplement data in the Original output sequence.

35. At least one computer readable medium as recited in claim 33, wherein data in the alternate output sequence includes confidence assessments regarding parts of the alternatives, where the confidence assessments replace at least part of the Original output sequence.

36. At least one computer readable medium as recited in claim 30, wherein the detected events involve word recognition.

37. At least one computer readable medium as recited in claim 36, wherein the automatic system is an automatic speech recognition system.

38. At least one computer readable medium as recited in claim 37,
wherein the automatic speech recognition system operates on low-grade audio signals having word recognition precision below 50 percent; and
wherein said method further comprises utilizing human transcription of the low-grade audio signals as a source for data relating to the statistics being collected.

39. At least one computer readable medium as recited in claim 36, wherein the automatic probabilistic event detection system is an automatic character recognition system.

40. At least one computer readable medium as recited in claim 36, wherein the alternate output sequence includes at least one of
an alternate recognition score for at least one of the words,
at least one alternate word that may have been one detectable event that transpired,
the at least one alternate word along with a recognition score for the at least one alternate word,
at least one alternate sequence of words that may have been another detectable event that transpired,
the at least one alternate sequence of words along with a recognition score for at least one word that is part of the at least one alternate sequence of words,
an indication that no detectable event has transpired,
a word lattice describing a plurality of alternatives for detectable word sequences, and
the word lattice along with a recognition score for at least one among
at least one word in the detectable word sequences,
at least one path in the word lattice, and
at least one edge in the word lattice.

41. At least one computer readable medium as recited in claim 30, wherein said using comprises:
building a first model modeling behavior of the automatic system as a process with at least one inner state, which may be unrelated to inner states of the automatic system, and inferring the at least one inner state of the process from the observed outputs of the automatic system;
building a second model, based on the statistics obtained by said collecting, to infer data to at least one of supplement and replace at least part of the Original output sequence from the at least one inner state of the process in the first model;
combining the first and second models to form a function for converting the Original output sequence into the alternate output sequence; and
using the function on the Original output sequence of the automatic system to create the alternate output sequence.

42. At least one computer readable medium as recited in claim 41, further comprising repeating said using of the function on different Original output sequences of the automatic system to create additional alternate output sequences.

43. At least one computer readable medium as recited in claim 41, wherein the process in said first model is one of a Generalized Hidden Markov process and a special case of a Generalized Hidden Markov process.

44. At least one computer readable medium as recited in claim 41,
wherein the second model is a parametric model, and
wherein said building of the second model uses at least one direct parametric estimation technique for inferring from at least one of the inner states.

45. At least one computer readable medium as recited in claim 44, wherein the at least one direct parametric estimation technique includes at least one of maximal likelihood estimation and entropy maximization.

46. At least one computer readable medium as recited in claim 41, wherein for at least one of the inner states said building of the second model uses at least one estimation technique utilizing information estimated for other inner states.

47. At least one computer readable medium as recited in claim 46, wherein the at least one estimation technique utilizes at least one of a mixture model and kernel-based learning.

48. At least one computer readable medium as recited in claim 41, wherein said building of the first and second models assumes the inner states of the process to be fully determined by the observed outputs during at least one point in time.

49. At least one computer readable medium as recited in claim 48, wherein said building of the first and second models assumes the inner states of the process during at least one point in time to be fully determined by a subset of the observed outputs that includes at least an identity of at least one event detected by the automatic system.

50. At least one computer readable medium as recited in claim 41, wherein said building of at least one of the first and second models uses at least one discretization function.

51. At least one computer readable medium as recited in claim 41, wherein at least one of said building and combining uses Bayesian methods.

52. At least one computer readable medium as recited in claim 30, further comprising repeating said collecting on several statistically different training materials.

53. At least one computer readable medium as recited in claim 52, wherein said collecting uses samples of statistically different sets of materials as initial training material.

54. At least one computer readable medium as recited in claim 53, further comprising identifying parameters that remain invariant between the statistically different sets of materials.

55. At least one computer readable medium as recited in claim 54, wherein said identifying improves estimation of at least one of the parameters.

56. At least one computer readable medium as recited in claim 54, wherein said identifying is used to enable training when available statistically self-similar sets of materials are too small to allow effective training.

57. At least one computer readable medium as recited in claim 54, wherein said identifying is used to increase effectiveness of further training on material that is not statistically similar to initial training material.

58. At least one computer readable medium as recited in claim 30, wherein material used for said collecting is statistically similar to material used during said using.

59. An apparatus for processing outputs of an automatic system for probabilistic detection of events, comprising:
    collection means for collecting statistics related to observed outputs of the automatic system comprising:
        providing means for providing at least one input sequence to the automatic system, the input sequence associated with a transcript;
        observing means for observing an output sequence of the automatic system generated in response to the provided at least one input sequence; and
        comparing means for comparing the output sequence with the transcript; and
    processing means for using the statistics to process automatically an Original output sequence of the automatic system and produce an alternate output sequence and a confidence assessment regarding parts of at least one of the Original output sequence and the alternate output sequence, the process including at least one of automatically supplementing and replacing at least part of the original Output sequence with the alternate output sequence in accordance with the confidence assessment.

60. An apparatus as recited in claim 59, wherein the alternate output sequence includes information of a plurality of alternatives that can replace at least part of the Original output sequence that can be used by systems that can use the at least part of the Original output sequence directly.

61. An apparatus as recited in claim 60, wherein data in the alternate output sequence includes confidence assessments regarding parts of the alternatives, where the confidence assessments supplement data in the Original output sequence.

62. An apparatus as recited in claim 59, wherein the detected events involve word recognition.

63. An apparatus as recited in claim 62, wherein the automatic system is an automatic speech recognition system.

64. An apparatus as recited in claim 62, wherein the alternate output sequence includes at least one of
    an alternate recognition score for at least one of the words,
    at least one alternate word that may have been one detectable event that transpired,
    the at least one alternate word along with a recognition score for the at least one alternate word,
    at least one alternate sequence of words that may have been another detectable event that transpired,
    the at least one alternate sequence of words along with a recognition score for at least one word that is part of the at least one alternate sequence of words,
    an indication that no detectable event has transpired,
    a word lattice describing a plurality of alternatives for detectable word sequences, and
    the word lattice along with a recognition score for at least one among
    at least one word in the detectable word sequences,
    at least one path in the word lattice, and
    at least one edge in the word lattice.

65. An apparatus as recited in claim 59, wherein said processing means comprises:
    first model means for building a first model modeling behavior of the automatic system as a process with at least one inner state, which may be unrelated to inner states of the automatic system, and inferring the at least one inner state of the process from the observed outputs of the automatic system;
    second model means for building a second model, based on the statistics obtained by said collection means, to infer data to at least one of supplement and replace at least part of the Original output sequence from the at least one inner state of the process in the first model;
    combination means for combining the first and second models to form a function for converting the Original output sequence into the alternate output sequence; and
    function means for applying the function to the Original output sequence of the automatic system to create the alternate output sequence.

66. An apparatus as recited in claim 65, wherein said function means applies the function on different Original output sequences of the automatic system to create additional alternate output sequences.

67. An apparatus as recited in claim 65, wherein the process in said first model is one of a Generalized Hidden Markov process and a special case of a Generalized Hidden Markov process.

68. An apparatus as recited in claim 65,
    wherein the second model is a parametric model, and
    wherein said second model means uses at least one direct parametric estimation technique for inferring from at least one of the inner states.

69. An apparatus as recited in claim 65, wherein said second model means, for at least one of the inner states, uses at least one estimation technique utilizing information estimated for other inner states.

70. An apparatus as recited in claim 69, wherein the at least one estimation technique utilizes at least one of a mixture model and kernel-based learning.

71. A system for processing outputs of an automatic system for probabilistic detection of events, comprising:
    an interface to receive observed outputs from the automatic system; and
    at least one processor programmed to:
    collect statistics related to the observed outputs of the automatic system by:
        providing at least one input sequence to the automatic system, the input sequence associated with a transcript;
        observing an output sequence of the automatic system generated in response to the provided at least one input sequence; and comparing the output sequence with the transcript; and use the statistics to automatically produce an alternate output sequence and a confidence assessment regarding parts of at least one of the Original output sequence and the alternate output sequence, thereafter at least one of automatically supplementing and replacing at least part of the Original output sequence of the automatic system with the alternate output sequence in accordance with the confidence assessment.

72. A system as recited in claim 71, wherein at least part of the alternate output sequence includes information of a plurality of alternatives that can replace at least part of the Original output sequence that can be used by systems that can use the at least part of the Original output sequence directly.

73. A system as recited in claim 71, wherein data in the alternate output sequence includes confidence assessments regarding parts of the alternatives, where the confidence assessments supplement data in the Original output sequence.

74. A system as recited in claim 71, wherein the detected events involve word recognition.

75. A system as recited in claim 74, wherein the automatic system is an automatic speech recognition system.

76. A system as recited in claim 75,
wherein the automatic speech recognition system operates on low-grade audio signals having word recognition precision below 50 percent; and
wherein said interface further receives human transcription of the low-grade audio signals for use by said processor as data relating to the statistics being collected.

77. A system as recited in claim 74, wherein the alternate output sequence includes at least one of
an alternate recognition score for at least one of the words,
at least one alternate word that may have been one detectable event that transpired,
the at least one alternate word along with a recognition score for the at least one alternate word,
at least one alternate sequence of words that may have been another detectable event that transpired,
the at least one alternate sequence of words along with a recognition score for at least one word that is part of the at least one alternate sequence of words,
an indication that no detectable event has transpired,
a word lattice describing a plurality of alternatives for detectable word sequences, and
the word lattice along with a recognition score for at least one among
at least one word in the detectable word sequences,
at least one path in the word lattice, and
at least one edge in the word lattice.

78. A system as recited in claim 71, wherein said processor is programmed to build a first model modeling behavior of the automatic system as a process with at least one inner state, which may be unrelated to inner states of the automatic system, and inferring the at least one inner state of the process from the observed outputs of the automatic system, to build a second model, based on the statistics obtained, to infer data to at least one of supplement and replace at least part of the Original output sequence from the at least one inner state of the process in the first model, to combine the first and second models to form a function for converting the Original output sequence into the alternate output sequence, and to apply the function to the Original output sequence of the automatic system to create the alternate output sequence.

79. A system as recited in claim 78, wherein said processor applies the function on different Original output sequences of the automatic system to create additional alternate output sequences.

80. A system as recited in claim 78, wherein the process in said first model is one of a Generalized Hidden Markov process and a special case of a Generalized Hidden Markov process.

81. A system as recited in claim 78,
wherein the second model is a parametric model, and
wherein said processor builds the second model using at least one direct parametric estimation technique for inferring from at least one of the inner states.

82. A system as recited in claim 78, wherein said processor, for at least one of the inner states, uses at least one estimation technique utilizing information estimated for other inner states.

83. A system as recited in claim 82, wherein said processor is programmed to utilize at least one of a mixture model and kernel-based learning as the at least one estimation technique.

* * * * *